May 2, 1933. J. H. BANINGER 1,906,243
BEARING MOUNTING
Filed July 10, 1930
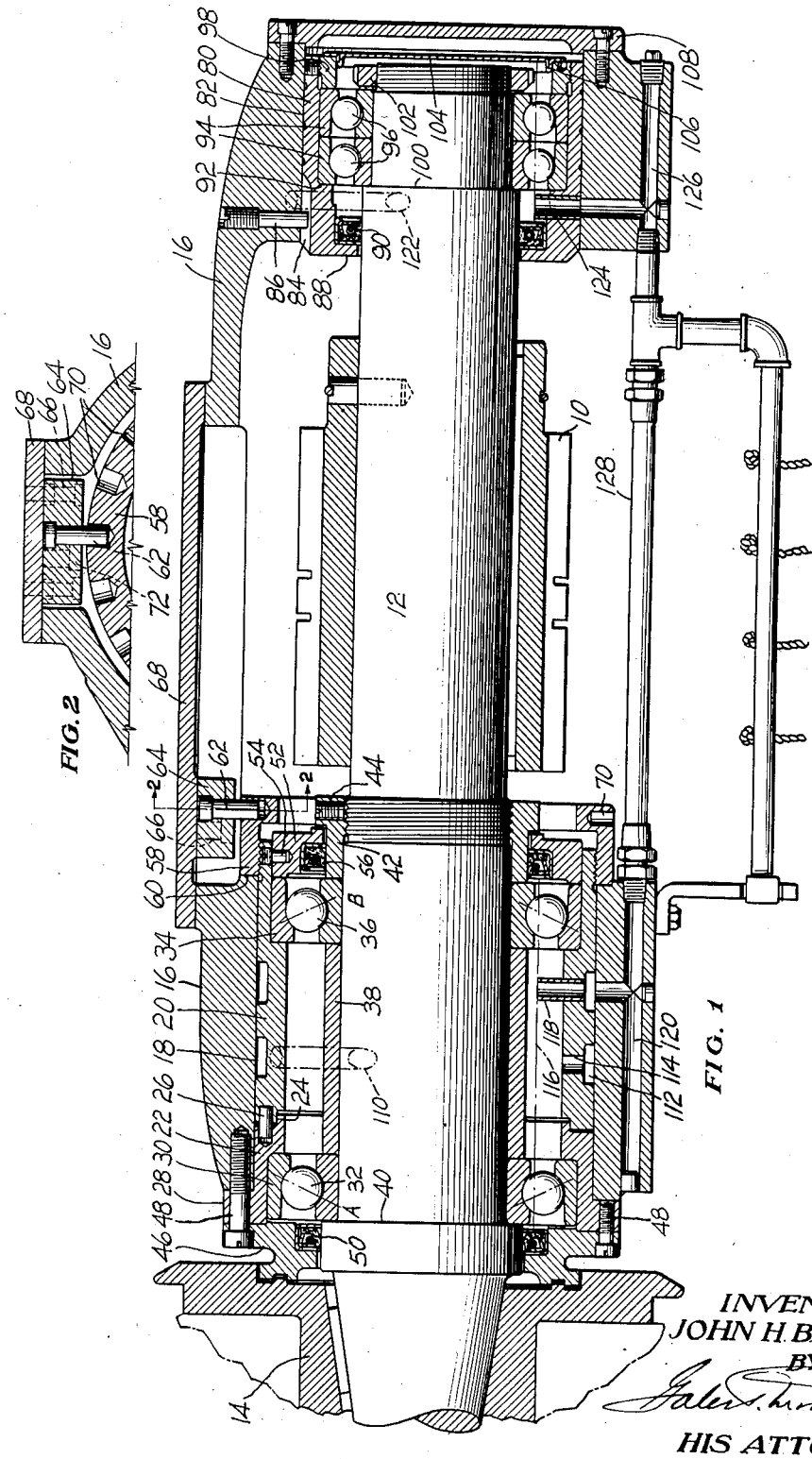
INVENTOR:
JOHN H. BANINGER,
BY
HIS ATTORNEY.

Patented May 2, 1933

1,906,243

UNITED STATES PATENT OFFICE

JOHN H. BANINGER, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

BEARING MOUNTING

Application filed July 10, 1930. Serial No. 466,997.

This invention relates to bearing mountings and comprises all the features of novelty herein disclosed. An object of the invention is to provide an improved antifriction mounting, especially for rotary shafts or spindles, to insure true running. Another object is to provide a shaft bearing mounting having its parts designed for convenient and accurate assembly and wherein the running parts are housed and protected previously to being inserted as an assembled unit into a casing or frame. Another object is to provide a bearing mounting wherein the antifriction elements can be preloaded only after insertion in a frame or casing thereby simplifying the manufacturing operation and making easier the assembly operation while improving the fit of the bearings in their seats when the internal load is applied.

To these ends and to improve generally and in detail upon devices of this character, the invention also consists in the various matters hereinafter described and claimed. In its broader aspects, the invention is not necessarily limited to the specific construction selected for illustrative purposes in the accompanying drawing in which Fig. 1 is a central longitudinal sectional view and Fig. 2 is a section on the line 2—2 of Fig. 1.

A driving member such as a sprocket wheel 10 rotatably drives the spindle or shaft 12 carrying at one end an operating tool such as a grinding wheel whose hub is indicated at 14. The shaft is antifrictionally mounted in a hollow frame or casing 16 having at one end a straight cylindrical bore 18 receiving a pair of sleeves or bearing housings 20 and 22 which overlap axially or telescope as indicated at 24. Relative rotation of the housings is prevented by a pin 26 fixed to one housing and freely entering an axial opening in the other, thereby allowing axial separation. Housing 22 has an outwardly extending flange 28 secured to an end face of the hollow frame or casing 16. An outer race ring 30 of an angular contact antifriction bearing, herein shown as a ball bearing 32, fits the bore of the housing 22 and abuts against an internal shoulder thereof. An outer race ring 34 of an opposed angular contact ball bearing 36 is similarly received in a bore of the housing 20 against a shoulder thereof. The nature of the fit while in no sense loose is such as to insure that the race rings will fully enter the bores and engage the shoulders. The high spots on the race rings are marked so that they can be kept in line to insure concentricity of the races. Thereafter the housings with their race rings are spread apart as will appear to preload the bearing balls along the angular contact lines A and B which diverge towards the shaft and a small resultant expansion of the outer rings insures a tight fit.

The inner race rings of the bearings fit the shaft 10 and are spaced apart by a sleeve 38. One inner race ring abuts against a shoulder 40 and the other is engaged by a flanged clamping nut 42 which has a portion threaded on the spindle and locked by a screw 44. A closure plate 46 closes the housing 22 and is secured to flange 28 by screws 48 some of the screws also entering the casing 16 to hold the flange 28. Closure plate 46 has a recess receiving any suitable seal 50 engaging the shaft to retain lubricant and exclude grit, and the closure plate also desirably has a small centering lip entering the housing 22 but preferably terminating out of contact with the race ring 30. A ring 52 enters the housing 20 and abuts against the race ring 34 where it is held by a locking pin 54 screwed into said housing. The ring surrounds the nut 42 inside the flange thereof and also has a recess for sealing members 56.

All of the above bearings and housing members can be conveniently assembled on the spindle before mounting the assembled structure in the hollow frame or casing 16. Not being initially loaded or expanded, the bearings easily enter their housings and are completely enclosed and protected thereby during the mounting operation. Only after assembly in the hollow frame or casing are the bearings loaded, as by an axial separation of their housings. In the illustrated construction, housing 20 is externally threaded at one end beyond the bore 18 and receives an adjusting nut 58 arranged to screw up against a shoulder 60 of the casing, thereby forcing the housing 20 axially away from its companion housing 22 and loading the bearings to insure firm contact of the rolling elements all around their raceways even when there is a heavy external load on the shaft. The opposed bearings are sufficiently close together so that expansion of the shaft will not be enough to materially change the load. The nut 58 can be locked in adjusted position by a headed pin 62 carried in a countersunk opening of a flat reversible block 64 which is fastened by screws 66 to a removable cover plate 68 closing an opening in the casing 16. The headed pin 62 enters a selected one of the series of openings 70 in the nut 58 and, in order that a fine adjustment may be had, the block 64 has one or more additional countersunk openings 72 offset from the other opening to receive the headed pin when the block 64 is reversed, the openings for the screws 66 being countersunk at both sides of the block so the block can be secured with either face against the cover plate.

The end of the shaft 12 beyond the driving member 10 is supported by antifriction bearings enclosed in a bearing housing 80 which can float axially in a bore 82 of the casing 16, this bore being aligned with the bore 18 but of smaller diameter. The bearing housing 80 has a key-slot 84 receiving the end of a screw pin 86 to prevent rotation while allowing axial floating if the shaft expands or contracts. The bearing housing has an end flange 88 and carries sealing members at 90 to make a tight joint with the shaft. Internally, the bearing housing 80 has a bore terminating in a shoulder 92, a pair of outer race rings 94 of opposed antifriction bearings 96 entering the bore and being clamped by a nut 98. The inner race rings of the bearings are clamped together on the spindle and against a shoulder 100 by a nut 102. The bearings are desirably angular contact ball bearings which become loaded when the nut 98 is set up and locked, the adjacent faces of the outer race rings 94 being suitably faced off to come into contact when the desired load is applied. The bearing housing is closed at the end by a cover plate 104 having an annular spring lip 106 pressed into the nut 98. The bearings and their housing can be assembled on the spindle before the spindle is mounted in the casing and are completely enclosed and protected during mounting operations. The assembled bearing housing 80 and driving member 10 will pass axially through the bore 18, which is larger than the bore 82. The bearings 96 are desirably smaller than bearings 32 and 36. The end of the casing 16 has a cover plate 108 removably secured by screws so that there is provision for access to the bearings after the shaft is mounted.

To lubricate the bearings 32 and 36, a wick 110, shown in broken lines, leads from an oil reservoir (not shown) into a peripheral groove 112 in the housing 20. Oil will pass into the housing through a hole 114 and rise to the level indicated at the broken line 116, excess lubricant running through the overflow pipe 118 into drain passages 120 in the casing 16. A similar wick 122 supplies oil to bearing housing 80 and excess lubricant flows through overflow pipe 124 to drain passages 126 which are connected to drain passages 120 by a pipe 128.

I claim:

1. In a bearing mounting, a shaft, a casing having a bore and an abutment face, a pair of bearing housings fitting in said bore and having oppositely facing shoulders, a pair of antifriction bearings having their inner race rings secured to the shaft and each having its outer race ring fitting in one of the housings against the shoulder, the bearings being of angular contact type and arranged to oppose one another, and a nut threaded on one of the bearing housings and engaging said abutment face to adjust one of the housings axially with respect to the other to apply an internal load to the rolling elements of the bearings; substantially as described.

2. In a bearing mounting, a shaft, a casing having a bore, a pair of bearing housings fitting in said bore and having oppositely facing shoulders, a pair of antifriction bearings having their inner race rings secured to the shaft and each having its outer race ring fitting in one of the housings against the shoulder, the housings axially overlapping one another to completely enclose the bearings, and means for causing an axial movement of one housing with respect to the other to apply an internal load to the rolling elements of the bearings; substantially as described.

3. In a bearing mounting, a shaft, a casing having a bore, a pair of bearing housings fitting in said bore and having oppositely facing shoulders, a pair of antifriction bearings having their inner race rings secured to the shaft and each having its outer race ring fitting in one of the housings against the shoulder, the housings axially overlapping one another to completely enclose the bearings, and means co-operating with the casing and one of the bearing housings for moving said one housing axially with respect to the other to apply an internal load to the rolling elements of the bearings; substantially as described.

4. In a bearing mounting, a shaft, a casing having a bore, a pair of bearing housings fitting in said bore and having oppositely facing shoulders, a pair of antifriction bearings having their inner race rings secured to the shaft and each having its outer race ring fitting in one of the housings against the shoulder, the housings axially overlapping one another to completely enclose the bearings, means for holding said housings from relative rotation, and means for causing an axial movement of one of said housings in the casing bore to apply an internal load to the rolling elements of the bearing; substantially as described.

5. In a bearing mounting, a shaft, a casing having a bore terminating at a shoulder, a pair of bearing housings in the bore, an angular-contact antifriction bearing between each housing and the shaft, one of the bearing housings having an externally threaded portion, a nut adjustable on said threaded portion and adapted to engage the shoulder of the casing whereby the bearings can be internally loaded only after their housings are inserted in the casing, and the housings forming a two part enclosure protecting the bearings; substantially as described.

In testimony whereof I hereunto affix my signature.

JOHN H. BANINGER.